(12) United States Patent
Gibb et al.

(10) Patent No.: US 6,663,996 B2
(45) Date of Patent: Dec. 16, 2003

(54) COMPRESSION MECHANISM FOR AN ELECTROCHEMICAL FUEL CELL ASSEMBLY

(75) Inventors: Peter Robert Gibb, Coquitlam (CA); Kemal Ozgur, Coquitlam (CA)

(73) Assignee: Ballard Power Systems Inc., Burnaby (CA)

(*) Notice: Subject to any disclaimer, the term of this patent is extended or adjusted under 35 U.S.C. 154(b) by 190 days.

(21) Appl. No.: 09/748,658

(22) Filed: Dec. 22, 2000

(65) Prior Publication Data

US 2002/0086199 A1 Jul. 4, 2002

(51) Int. Cl.⁷ .......... H01M 2/00; H01M 2/02; H01M 2/08; H01M 2/14
(52) U.S. Cl. .............. 429/37; 429/34; 429/38
(58) Field of Search .............. 429/12, 13, 34, 429/35, 36, 37, 38; 267/70

(56) References Cited

U.S. PATENT DOCUMENTS

| | | | | |
|---|---|---|---|---|
| 4,044,437 A | * | 8/1977 | Ebenstein | 28/151 |
| 4,118,553 A | * | 10/1978 | Buckethal et al. | 429/234 |
| 4,514,475 A | * | 4/1985 | Mientek | 429/35 |
| 4,609,595 A | * | 9/1986 | Nickols | 429/247 |
| 5,185,220 A | * | 2/1993 | Schora | 429/35 |
| 2,233,592 A | | 3/1994 | Dunajeff | 29/180 |
| 5,484,666 A | | 1/1996 | Gibb et al. | 429/34 |
| 5,486,430 A | | 1/1996 | Gorbell et al. | 429/35 |
| 5,543,241 A | | 8/1996 | Nishioka et al. | 429/39 |
| 5,686,200 A | | 11/1997 | Barton et al. | 429/37 |
| 5,789,091 A | | 8/1998 | Wozniczka et al. | 429/12 |
| 5,976,727 A | * | 11/1999 | Mercuri et al. | 429/37 |
| 6,037,074 A | * | 3/2000 | Mercuri et al. | 428/163 |
| 6,066,409 A | * | 5/2000 | Ronne et al. | 429/32 |
| 6,149,810 A | * | 11/2000 | Gonzalez-Martin et al. | 204/252 |

FOREIGN PATENT DOCUMENTS

| JP | 09092324 | 4/1997 |
|---|---|---|
| WO | WO 00/08353 | 2/2000 |

* cited by examiner

Primary Examiner—Randy Gulakowski
Assistant Examiner—Donald V. Scaltrito
(74) Attorney, Agent, or Firm—McAndrews, Held & Malloy, Ltd.

(57) ABSTRACT

A compression mechanism comprises a planar spring sheet having a plurality of openings rendering the spring sheet resilient. An electrochemical fuel cell assembly with resilient compression mechanism includes a plurality of fuel cell assemblies interposed between first and second endplates. The mechanism for securing the fuel cell assemblies in their assembled, compressed state includes at least one resilient compression spring sheet extending between first and second endplates.

18 Claims, 7 Drawing Sheets

COMPRESSION MECHANISM FOR AN ELECTROCHEMICAL FUEL CELL ASSEMBLY

FIELD OF THE INVENTION

The present invention relates to compression mechanisms. More particularly, the present invention relates to compression mechanisms for fuel cell assemblies in which the mechanism for securing the assemblies in their assembled, compressed state comprises at least two compression spring sheets which extend under tension between endplates of the fuel cell assembly urging the endplates toward one another.

BACKGROUND OF THE INVENTION

Electrochemical fuel cells convert fuel and oxidant to electricity and reaction product. Solid polymer electrochemical fuel cells generally employ a membrane electrode assembly ("MEA") consisting of a solid polymer electrolyte or ion exchange membrane disposed between two electrode layers comprising porous, electrically conductive sheet material and an electrocatalyst disposed at each membrane/electrode layer interface to induce the desired electrochemical reaction.

In a PEM fuel cell, the MEA is disposed between two electrically conductive separator or fluid flow field plates. Fluid flow field plates have at least one flow passage formed therein to direct the fuel and oxidant to the respective electrode layers, namely, the anode on the fuel side and the cathode on the oxidant side. In a single cell arrangement, fluid flow field plates are provided on each of the anode and cathode sides. The plates act as current collectors and provide support for the electrodes.

Two or more fuel cells can be connected in series or in parallel to increase the overall power output of the assembly. In series arrangements, one side of a "bipolar" plate can serve as the anode plate for one cell with the other side of the plate serving as the cathode plate for an adjacent cell. Such a multiple fuel cell arrangement connected in series is referred to as a fuel cell stack, and typically is held together in its assembled state by tie rods or compression bands and endplates.

A fuel cell stack typically includes manifolds and inlet ports for directing fuel and oxidant streams to the anode and cathode flow field passages respectively. Usually the stack includes a manifold and inlet port for directing a coolant fluid, typically water, to interior passages within the stack to absorb heat generated by the exothermic reaction in the fuel cells. The stack also generally includes exhaust manifolds and outlet ports for expelling fuel and oxidant exhaust streams, as well as an exhaust manifold and outlet port for the coolant stream exiting the stack.

Typically, endplates are placed at each end of the stack to hold the stack together and to compress the stack components together. Compressive force is needed for effecting seals and making adequate electrical contact between various stack components. For various reasons, some resilience is generally desirable in the compression endplate assemblies, for instance to accommodate and compensate for dimensional changes and to maintain compressive force over prolonged periods of time. Examples of various resilient compression endplate assemblies are disclosed in U.S. Pat. Nos. 5,484,666 and 5,789,091.

To reduce the number of component parts, and improve volume efficiency, stack manifolds can be incorporated into compression endplates of fuel cell stacks in an array. For example, U.S. Pat. No. 5,486,430 shows an array manifold integrated into the compression endplates of multiple fuel cell stacks.

In conventional fuel cell designs, the components that make up each fuel cell assembly are compressed and maintained in their assembled state by tie rods. The tie rods extend through holes formed in the peripheral edge portion of the stack endplates and have associated nuts or other fastening means for assembling the tie rods with the stack assembly and springs or other resilient means for urging the endplates toward each other. A fuel cell stack design incorporating internal tie rods which extend between the endplates through openings in the fuel cell plates and membrane electrode assemblies has been described in U.S. Pat. No. 5,484,666.

Use of external tie rods requires that each of the endplates be greater in area than the stacked fuel cell assemblies interposed therebetween, which can increase stack volume and stack weight significantly. This is particularly undesirable in transportation applications using fuel cells. The associated fasteners also increase the number of parts required to assemble a stack.

The use of compression bands to compress fuel cell stacks has been described in U.S. Pat. No. 5,789,091. In the compression band system, at least one compression band circumscribes the first and second endplate assemblies and the interposed electrochemical fuel cell assemblies. The resilient compression assembly urges the first endplate assembly toward the second endplate assembly, thereby applying compressive force upon the fuel cell assembly. The compression assembly for compressing the fuel cell assemblies preferably applies the desired internal compressive force while accommodating changes in fuel cell thickness.

Traditional compression assemblies comprise springs and/or hydraulic pistons, employed either individually or in combination. Springs are often used as a backup to provide a compressive force if the hydraulic piston pressure is lost or inadequate for applying the desired compressive force for efficient and safe fuel cell operation. In either case, ideally the desired compressive force is applied to the fuel cell assemblies over the range of internal pressures expected in an operational fuel cell stack. Unfortunately, the use of a hydraulic piston adds to the complexity of the fuel cell stack and can be a source of unreliability, with potentially adverse consequences if the piston-based compression system fails.

In lieu of hydraulic pistons, some conventional fuel cell stacks use compressed springs in conjunction with a retention device, such as tie rods or compression bands. In response to reductions in the thickness of stack components, the compressed springs expand, to continue to apply compressive force to the fuel cell assembly.

In general, a problem with compressed springs is that as a compressed spring expands, its spring force declines, resulting in a decreasing ability to apply compressive force to the stack components. The decline in spring force can be reduced by using a spring having a very low spring rate. For example, disc springs (sometimes referred to as Belleville springs or Belleville washers) can be made with a spring rate suitable for use in fuel cell compression assemblies.

In conventional fuel cell stacks, the desire to have a low spring rate to accommodate stack component shrinkage is balanced against the need for a very high spring rate to counter the effect of changes in internal stack fluid pressure on internal compressive force. In conventional fuel cells, a compromise is typically made between these two conflicting requirements by applying high pre-compression forces to mechanical compression assemblies and limiting stack fluid pressures.

In the field of fuel cell compression systems, it is desirable to employ a spring device capable of high loading with high deflection. Such requirements can be met with a compression spring sheet as described herein.

SUMMARY OF THE INVENTION

In one embodiment, a compression spring sheet comprises a generally planar material rendered resilient by having a plurality of openings therein.

The plurality of openings may comprise internal openings of a first shape and dimension disposed in longitudinal rows, and peripheral openings of a second shape and dimension, wherein at each opposing end of said spring sheet a peripheral opening is disposed at the end of each alternating row of internal openings.

In a further embodiment, each internal opening comprises first and second lobes and each opening is symmetrical about its longitudinal and transverse axes. A plurality of the first lobes in each row are aligned with the second lobes in adjacent rows.

The compression spring sheet material may be a metal, such as, for example, a metal selected from the group comprising aluminum, steel and titanium. The compression spring sheet may further comprise a plastic coating. Certain plastics may also be suitable materials for compression spring sheets.

Upon the application of in-plane tensile force perpendicular to the longitudinal axis of said openings, the compression spring sheet preferably exhibits approximately uniform stress along the edges of the openings. For example, the stress at any point along the edges preferably varies by no more than 15% relative to the mean stress along the edges of the openings. Preferably, the average stress force on the material surrounding the internal openings is approximately equivalent to the average stress force on the material surrounding the peripheral openings.

In one embodiment of a compliant compression mechanism for an electrochemical fuel cell assembly, the assembly comprises a first plate; a second plate; and at least one membrane electrode assembly interposed between the first and second plates, the mechanism comprising at least one compression spring sheet, each spring sheet comprising a generally planar material rendered resilient by having a plurality of openings formed therein, wherein each spring sheet extends between said first and second plates perpendicular to the plane of the at least one membrane electrode assembly, whereby each spring sheet urges the first plate towards the second plate such that compressive force is applied to the at least one membrane electrode assembly.

The plurality of openings may comprise internal openings of a first shape and dimension and peripheral openings of a second shape and dimension, wherein the internal openings are disposed in longitudinal rows extending between opposed ends of the spring sheet. At each end of the spring sheet, a peripheral openings may be disposed at the end of each alternating row of internal openings.

In a further embodiment, the first and second plates may be endplates. A plurality of fuel cell assemblies may be interposed between the first and second plates. In another embodiment, a plurality of fuel cell stacks may be interposed between the first and second plates.

In another embodiment of a compliant compression mechanism, a pair of opposed spring sheets may be joined by at least one band extending perpendicularly to the spring sheets across the face of one of the plates.

The compliant compression mechanism may comprise on each side at least two substantially co-planar compression spring sheets extending between the endplates of a fuel cell assembly. The total area covered by the one or more compression spring sheets disposed on a side of a fuel cell assembly may be less than the total area of such side.

DETAILED DESCRIPTION OF THE PREFERRED EMBODIMENT(S)

Figure 1:
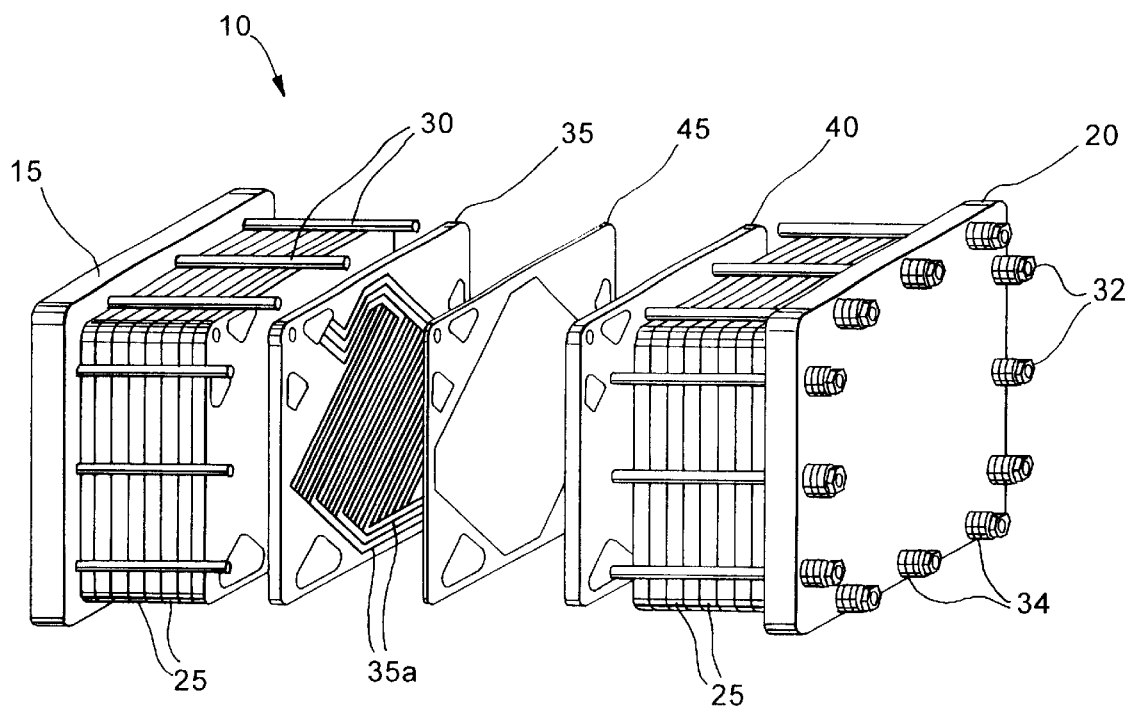
FIG. 1 is a partially exploded view of a conventional (prior art) solid polymer fuel cell stack with endplates and external tie rods.

FIG. 1 illustrates one embodiment of a conventional (prior art) solid polymer fuel cell stack 10, including a pair of endplate assemblies 15, 20 and a plurality of fuel cell assemblies 25 interposed between them. Tie rods 30 extend between endplate assemblies to retain and secure the stack assembly 10 in its assembled state with fastening nuts 32. Springs 34 threaded on the tie rods 30 interposed between the fastening nuts 32 and the endplate 20 apply resilient compressive force to the stack in the stacking direction. Reactant and coolant fluid streams are supplied to and exhausted from internal manifolds and passages in the stack via inlet and outlet ports (not shown) located in endplate assembly 15.

As also shown in FIG. 1, each fuel cell assembly 25 includes an anode flow field plate 35, a cathode flow field plate 40, and a membrane electrode assembly 45 interposed between plates 35 and 40. Plate 35 has a plurality of fluid flow passages 35a formed in its major surface facing the membrane electrode assembly 45.

Figure 2:
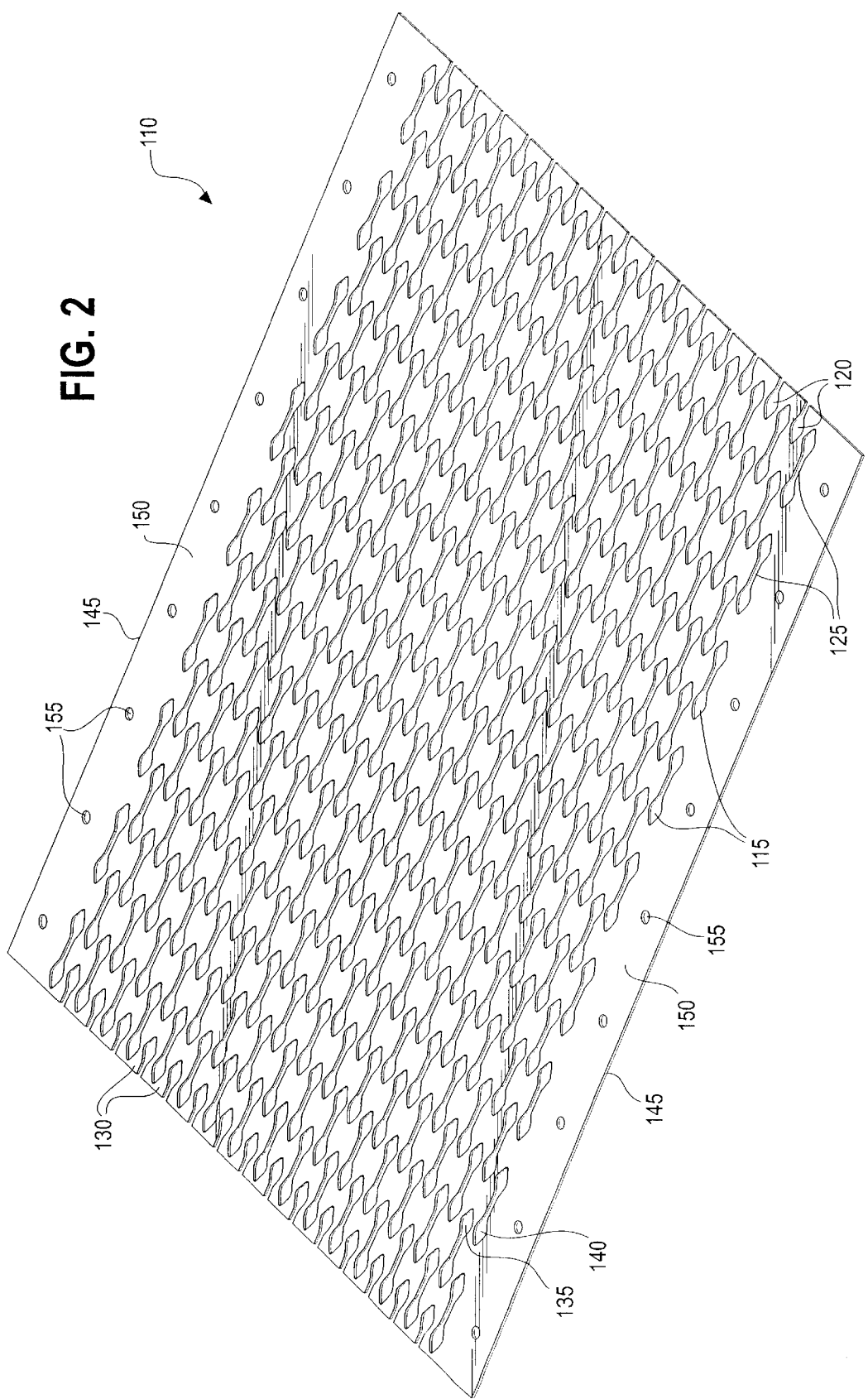
FIG. 2 is a perspective view of one embodiment of a compression spring sheet.

In the embodiment illustrated in FIG. 2, compression spring sheet 110 comprises a generally rectangular sheet with regularly repeating internal 115 and peripheral 120 openings. Internal openings approximate the two-lobed shape of a dumbbell and are of approximately identical dimensions. Each internal opening narrows at its longitudinal midpoint 125, and is substantially symmetrical about its longitudinal and transverse axes. Each peripheral opening approximates the shape of one end of a dumbbell and the peripheral openings are all of approximately identical dimensions. The dumbbell shaped openings are oriented perpendicular to the direction of compressive force exerted by the spring sheet.

The plurality of internal openings are disposed end-to-end in rows 130, each alternate row of internal openings having a peripheral opening disposed at either end. Thus, rows having peripheral openings are interspersed with rows comprised only of internal openings. The first lobe 135 of an internal opening in one row aligns with an oppositely oriented second lobe 140 of an internal opening in an adjacent row, such that narrowed midpoints 125 of the internal openings align in alternating rows. Peripheral openings generally align with the outer lobe of the outermost internal opening in an adjacent row. In an alternative embodiment, one peripheral opening is disposed at opposing ends of each adjacent row of internal openings.

The presence of a plurality of regularly shaped openings formed in the sheet decreases the stiffness of the sheet and permits a larger deflection under load than would be possible in the absence of such openings. The shapes of the openings in the spring sheet are selected to provide approximately uniform stress distribution along the edges of the openings when the spring sheet is under load. In particular, the shape and dimensions of the peripheral openings may be selected such that the average stress force on the material surrounding the peripheral openings is approximately equivalent to the average stress force on the material surrounding the internal openings.

The single-lobed peripheral openings differ in shape and dimension from the two-lobed internal openings in order to maintain approximately uniform stress distribution along the edges of all openings when the compression spring sheet is under loading. Dimensions of both the internal and the peripheral openings may vary with the type and thickness of the material of which the sheet is composed.

In general, load capability and stiffness of the spring sheet correlate linearly with sheet thickness. One limitation to reduction of the thickness of the spring sheet is out-of-plane distortion of the sheet. Where the ratio of opening size to plate thickness is too great, side-bending may occur. Upon the occurrence of such side-bending, the relationship between applied tensile force and spring deflection becomes non-linear.

Figure 3:
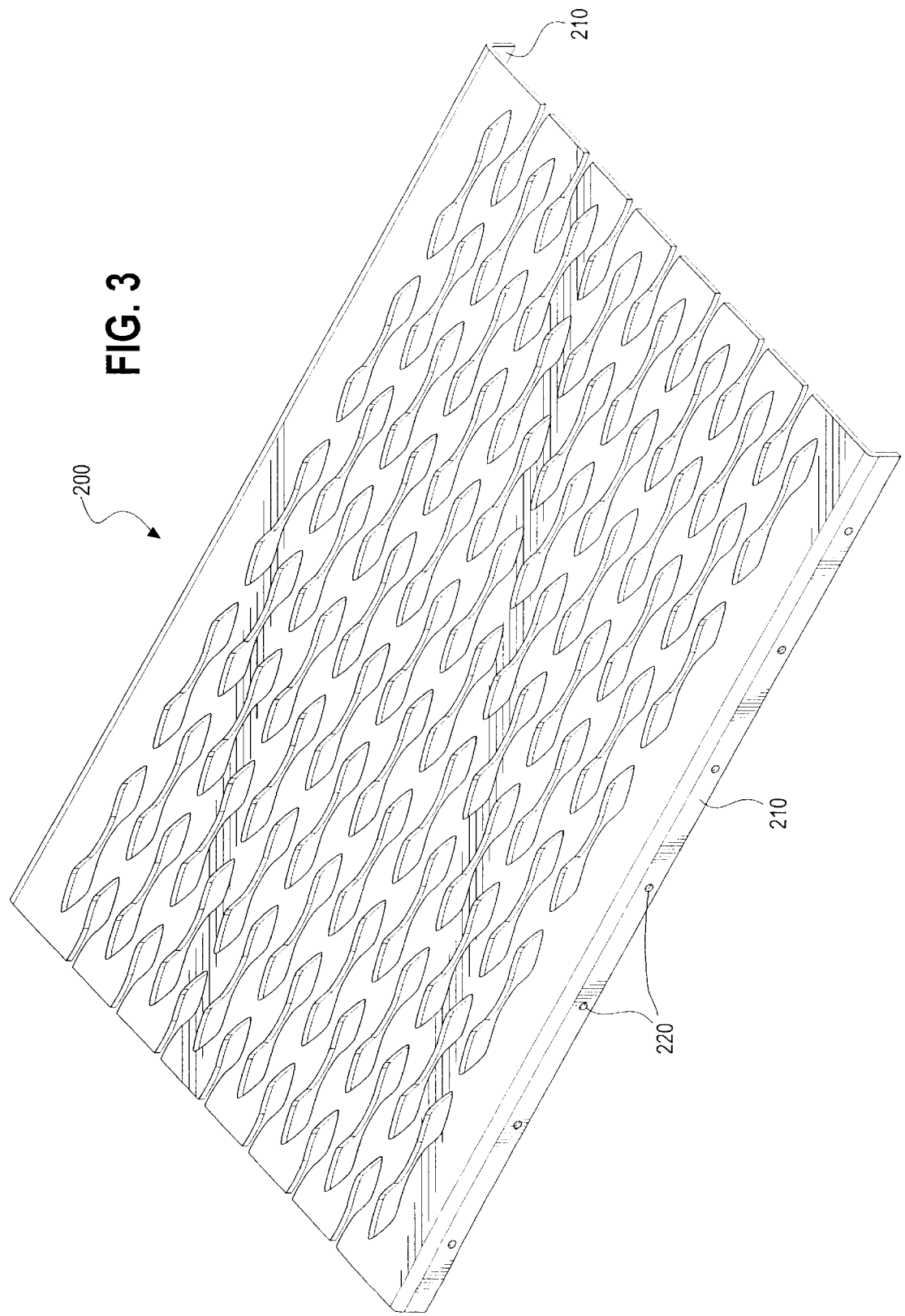
FIG. 3 is a perspective view of another embodiment of a compression spring sheet showing opposed perpendicular edges for attachment of the spring sheet to the stack.

In the embodiment of a compression spring sheet depicted in FIG. 2, the pattern of internal and peripheral openings is inset from the edges 145 of the sheet to provide a lateral attachment region 150 for attachment of the sheet 110 to the fuel cell endplates. Several openings 155 are situated in attachment region 150 for insertion of fasteners (not shown) to affix sheet 110 to the edges of endplates. In an alternative embodiment of a spring sheet 200 illustrated in FIG. 3, lateral attachment regions 210 and fastener openings 220 are at right angles to the plane of the spring sheet, and the sheet is affixed to the outer faces of the endplates. In a further embodiment (not shown), the lateral attachment regions may extend sufficiently across the face of the endplates so as to permit secure attachment of the spring sheet to the endplates without fasteners, welding or other securing devices.

Figure 4:
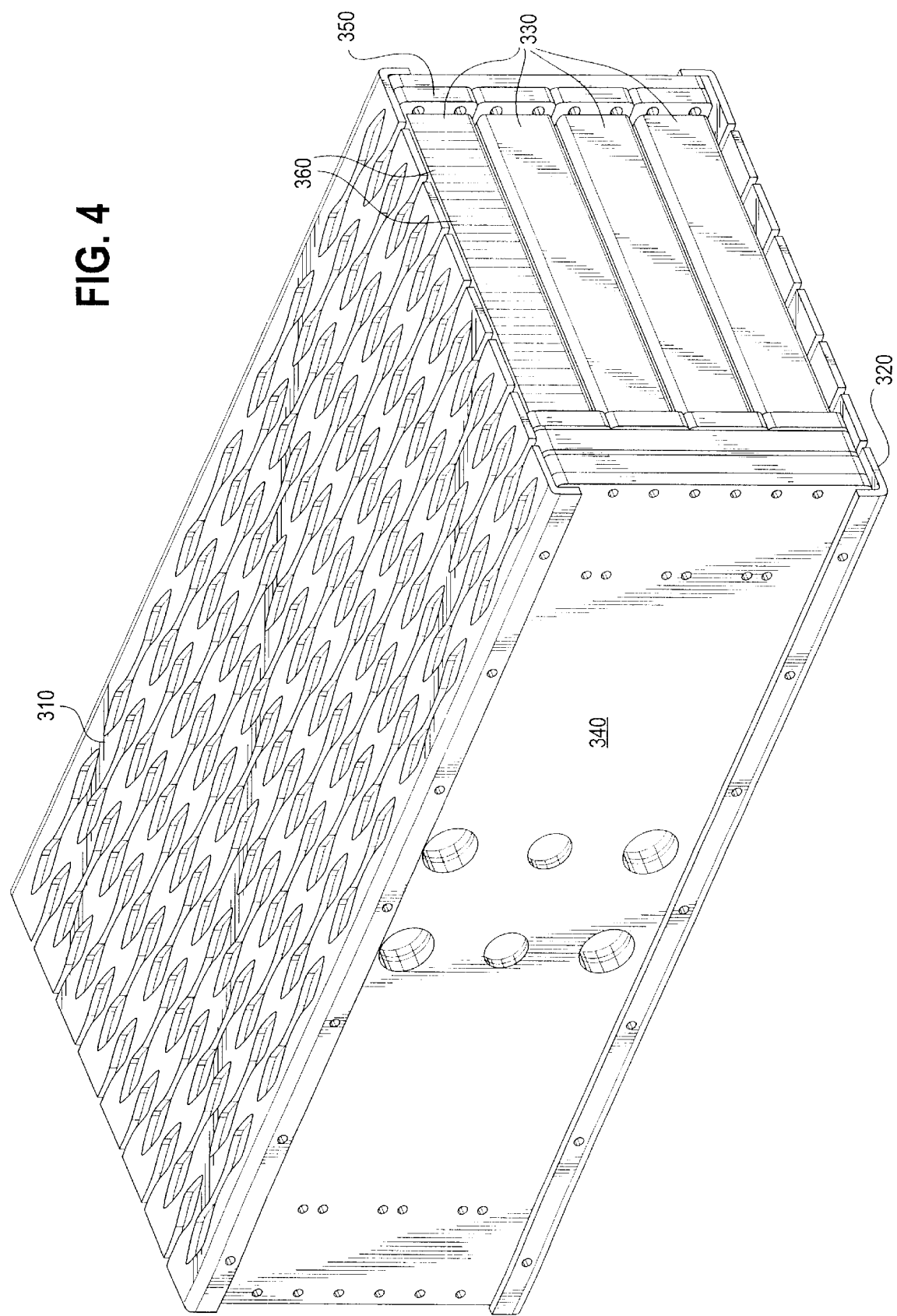
FIG. 4 is a perspective view of one embodiment of a four-stack electrochemical fuel cell array compressed between endplates by two compression spring sheets.

As shown in FIG. 4, two compression spring sheets 310, 320 extend across opposing sides of an array of four fuel cell stacks 330 between manifold plate assembly 340 and compression endplate assembly 350, perpendicular to the plane defined by each fuel cell assembly. The plurality of openings disposed in each compression spring sheet permits deflection of the spring sheets under force, and retraction of the spring sheets upon removal of such force. Accordingly, in operation a pair of planar spring sheets may each be overstretched in a direction perpendicular to the longitudinal axes of the dumbbell shaped openings, positioned adjacent and perpendicular to cells on opposing sides of one or more fuel cell stacks, fastened or otherwise secured to opposed endplates, and permitted to retract, thereby urging the endplates together and compressing the stack(s). Spring sheets of appropriate sizes may be used to compress individual stacks or multistack arrays.

In an alternative embodiment (not shown) of the fuel cell stack assembly of FIG. 4, the single wide spring sheet on each side of the fuel cell stacks may be replaced by a plurality of adjacent narrower spring sheets on each side.

Figure 5:
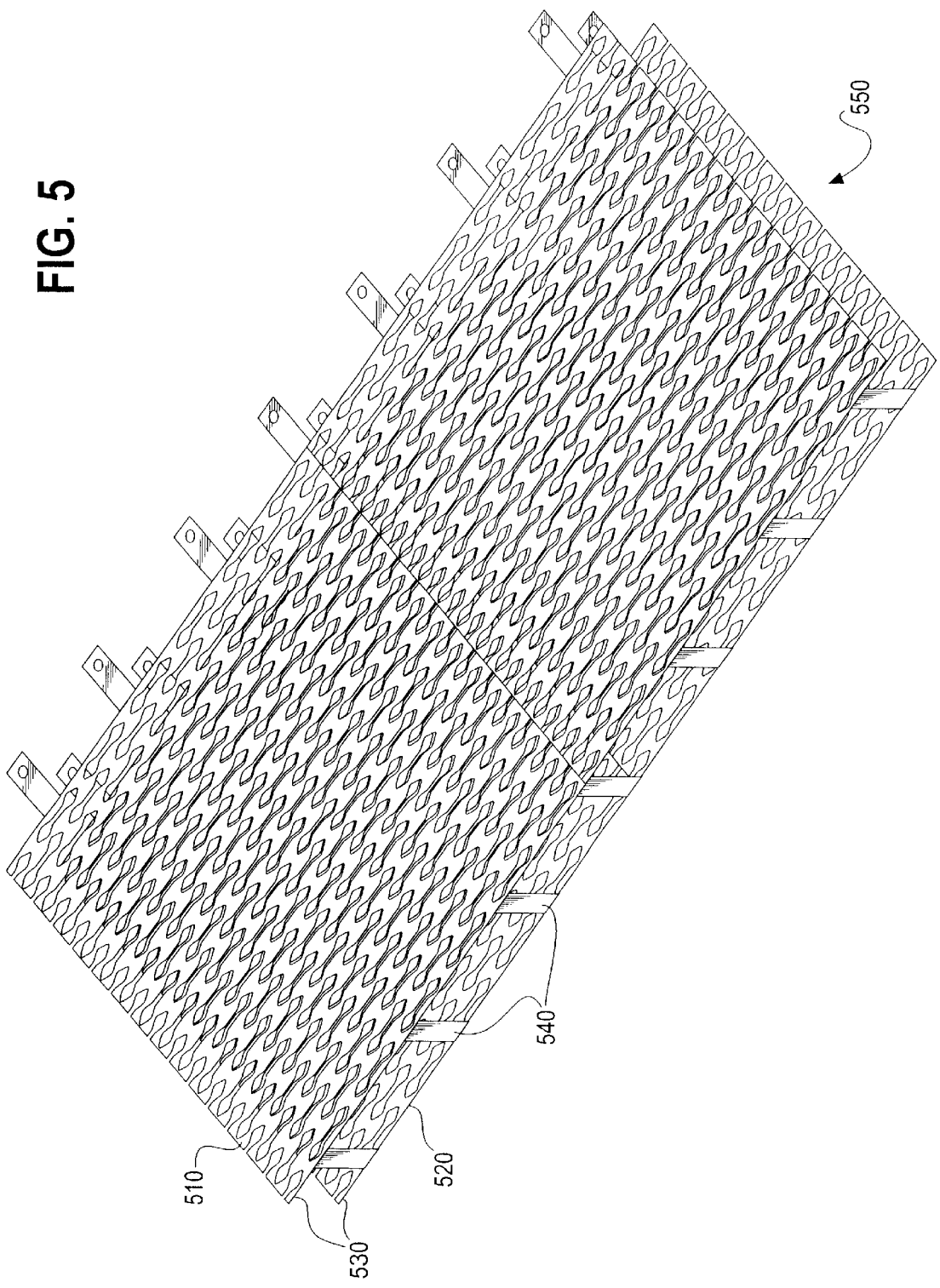
FIG. 5 is a perspective view of one embodiment of two parallel compression spring sheets joined at adjacent ends to form a U-shaped spring sheet assembly.

In an alternative embodiment as seen in FIG. 5, two compression spring sheets 510, 520 may be joined at edges 530, for example with parallel bands 540 of solid material, to form a generally U-shaped spring sheet assembly. Such bands of sufficient width may also comprise internal and peripheral openings (not shown) rendering the bands resilient, thereby providing compressive force to urge individual fuel cell stacks in an array toward one another.

In an alternative method, one or more fuel cell stacks may be overcompressed for installation of the spring sheet(s). In each of the embodiments described, attachment of the spring sheet to the endplates may be accomplished in a variety of ways, including use of fasteners and welding. The spring sheet may also be provided with perpendicular lateral attachment regions, similar to those shown in FIG. 3, but which extend substantially across the endplates, thereby holding the fuel cell assemblies between the endplates without fasteners or welding.

Installation of compression spring sheets on a fuel cell stack or array may also be achieved by temporarily overcompressing the stack(s); attaching the compression spring sheet(s) to the stack or array, and allowing the overcompressed stack(s) to decompress slightly, thereby stretching the spring sheets, which thereafter maintain compressive force on the stack.

Figure 6:
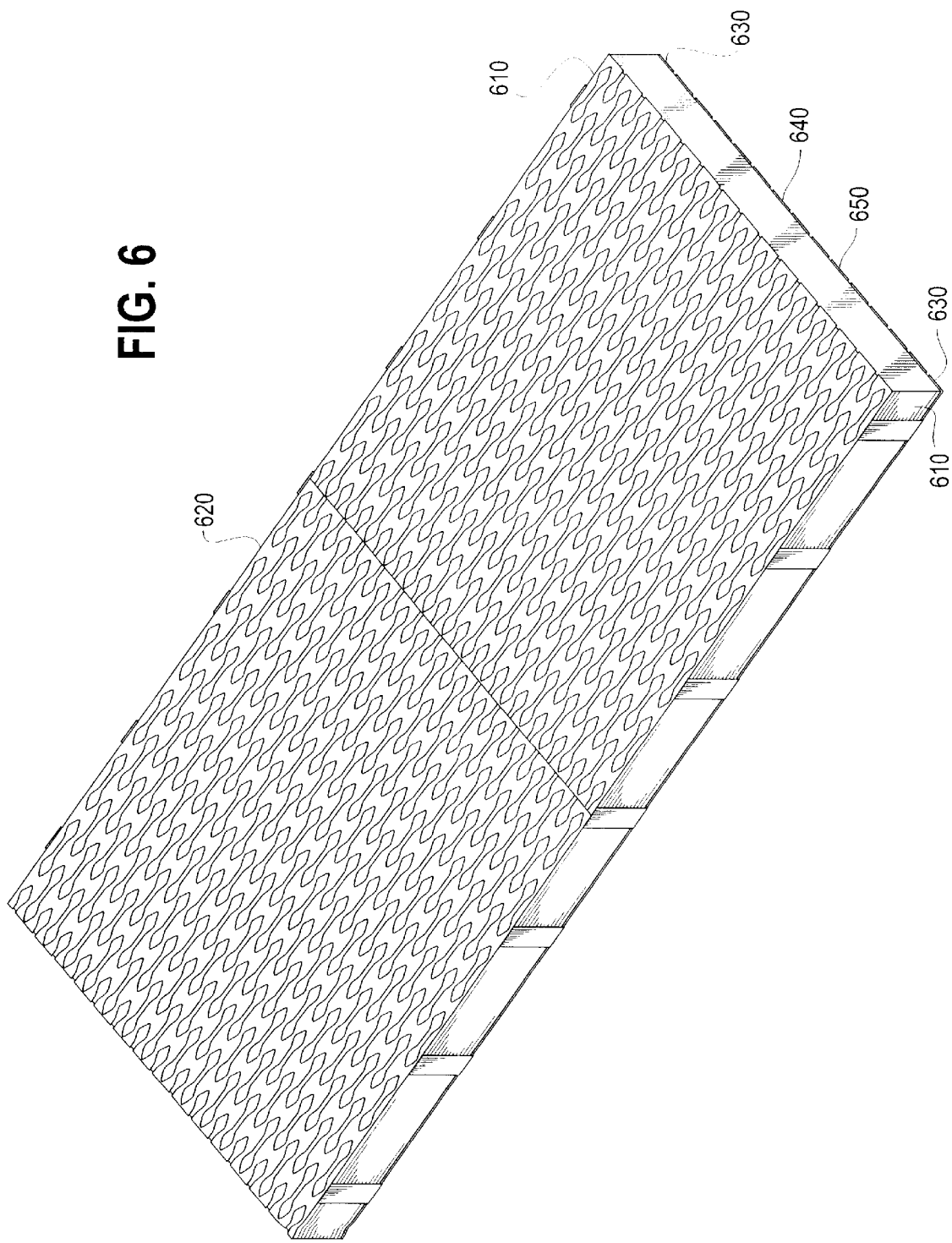
FIG. 6 is a perspective view of one embodiment of an electrochemical fuel cell stack compressed by an U-shaped spring sheet assembly.

In another embodiment, both edges 610 of a first compression spring sheet 620 may be joined to corresponding edges 630 of a second compression spring sheet 640 before or after installation on a stack or array. FIG. 6 illustrates a single fuel cell stack 650 compressed by such a device. One method of compressing a fuel cell stack according to the embodiment illustrated in FIG. 6 comprises the steps of securing first and second spring sheets to a first endplate; inserting stack 650 between first and second spring sheets; compressing stack 650 to a compression level in excess of normal operating compression levels while simultaneously stretching first 620 and second 640 spring sheets; securing edges of first and second spring sheets to second endplate; and releasing pressure on the stack and spring sheets.

In a further embodiment (not shown) of a compressed array of fuel cell stacks, a single compression spring sheet may extend in between adjacent stacks in the array. Such a spring sheet may have lateral attachment regions on each end forming overall an I-shaped spring sheet, thereby permitting the attachment regions (the bars of the I) to be secured to adjacent stacks in the array. The attachment regions may extend sufficiently across the endplates of adjacent stacks to permit securing without fasteners or welding.

Figure 7:
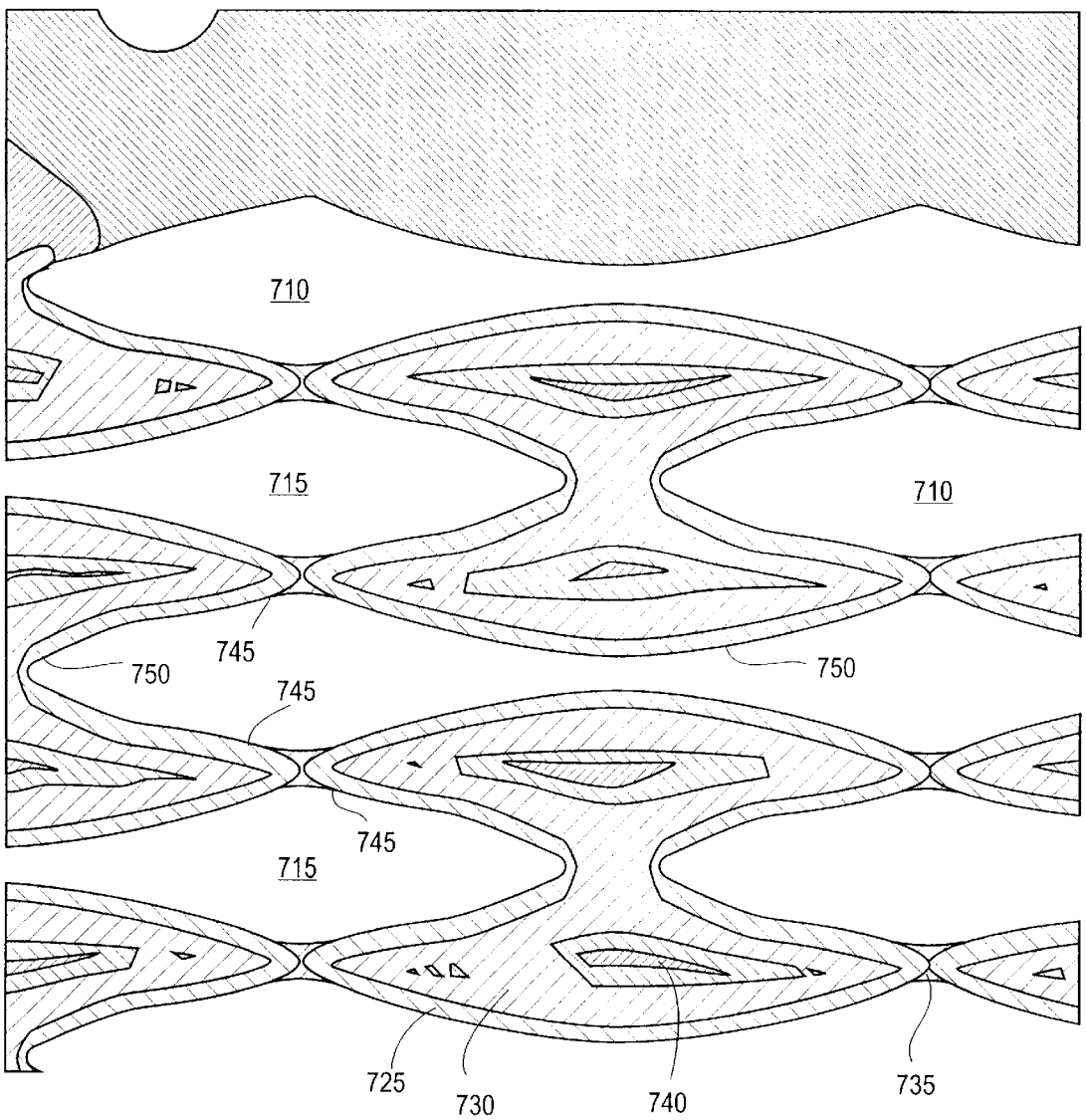
FIG. 7 is a stress contour diagram of a finite element analysis model showing the distribution of stress on a compression spring sheet under in-plane tensile stress perpendicular to the longitudinal axes of the internal openings in the spring sheet.

FIG. 7 depicts a stress contour diagram of loading results obtained for a finite element analysis model of one embodiment of a compression spring sheet. The spring sheet embodiment in this model is aluminum (Grade 7075) with dimensions 730 mm by 300 mm by 2 mm. It is loaded with a force of 10 kN.

The model shows a section of a spring sheet in proximity to a lateral attachment region 705. Several rows of internal 710 and peripheral 715 openings are indicated, separated by interconnected sections of the aluminum spring sheet 720. In the diagram, stress values within a particular range measured in MPa are depicted by a contour of a particular shade. Several contours 725, 730 of stress ranges are visible throughout the model, ranging from higher stress regions 735 with stress values within a range of approximately 311–350 MPa where the spring sheet material narrows, to lower stress regions 740 with stress values within a range of approximately 0–39 MPa where the material is widest.

As shown in FIG. 7, the stress values along the edges of the openings 710, 715 in the spring sheet are within a relatively narrow range. Along the edges where the openings are widest 745, stress values vary by no more than approximately 10%. Overall, at any point along the edges of the openings 745, 750, stress values vary by no more than 25% from the average. This approximately uniform stress distribution permits the spring sheet to act as a resilient spring.

In one embodiment of a planar spring sheet, the thickness of the material comprising the spring sheet may be non-uniform. For example, at points furthest from the edges of the openings, where the stress values are lowest (as depicted by the darkest regions in FIG. 7), the thickness of the material may be reduced. The thickness of the material of the spring sheet may be varied such that uniform stress is exhibited throughout the spring sheet, rather than primarily along the edges of the openings.

The compression spring sheet compression mechanism permits compression of individual stacks which may be used in a modular fashion with other compressed stacks to form an array of an appropriate size. For example, in some mobile applications, an array of three modular compressed fuel cell stacks may deliver sufficient power levels, while in other applications an array of four modular compressed stacks may be desirable to achieve higher power levels.

Compression spring sheets may be manufactured at low volumes by water jet cutting. High volume manufacture may be accomplished using a stamping process. In one embodiment, high volume manufacture may produce a continuous planar sheet that can be cut to a desirable length appropriate to its particular use. In one embodiment, openings could subsequently be cut or stamped into the spring sheet for attachment of the spring sheet to the fuel cell assembly or other device to be compressed. Such a continuous planar sheet would permit a single high volume manufacturing process to produce a variety of sizes of spring sheets. As exposure to the operating environment of an electrochemical fuel cell may cause embattlement in steel, aluminum is a preferred material for manufacture of compression spring sheets for fuel cells. For example, a compression spring sheet may be comprised of aluminum having a thickness of approximately 6 mm or spring sheets may be made of high strength steel having a thickness of 0.75–3 mm. Other materials, including titanium and some plastics, may also be used in the manufacture of compression spring sheets.

Spring sheets used in compressing fuel cell assemblies may be coated to electrically isolate the fuel cell. For example, such a coating may comprise plastic.

In one embodiment of a fuel cell stack 800 mm wide and assembled with compression spring sheets, the fuel cell stack module is subject to loading conditions of 80 kN. Accordingly, each of a pair of spring sheets used in the assembled stack is preferably loaded to 40 kN. An aluminum sheet having five rows of openings can provide sufficient resiliency and tensile strength to provide compression for such a fuel cell stack.

The use of compression spring sheets can decrease the overall number of parts required for a compression assembly by eliminating the need for Belleville springs and reducing the number and complexity of fasteners required. Spring sheets not only provide a compression mechanism, but may also form part of the enclosure of the fuel cell module, resulting in a reduction in overall weight of the fuel cell module.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features that come within the scope of the invention.

What is claimed is:

1. A compression spring sheet comprising a generally planar material rendered resilient by having a plurality of openings therein, wherein said plurality of openings comprises internal openings of a first shape and dimension disposed in rows extending between opposed ends of said spring sheet and peripheral openings of a second shape and dimension.

2. The compression spring sheet of claim 1 wherein at each of said opposed ends of said spring sheet, one of said peripheral openings is disposed at the end of each alternating row of internal openings.

3. The compression spring sheet of claim 2 wherein each of said internal openings comprises first and second lobes and is symmetrical about its longitudinal and transverse axes.

4. The compression spring sheet of claim 3 wherein a plurality of said first lobes in each of said rows aligns with said second lobes in each adjacent row.

5. The compression spring sheet of claim 1 wherein said material is a metal.

6. The compression spring sheet of claim 5 wherein said metal is selected from the group comprising aluminum, steel and titanium.

7. The compression spring sheet of claim 6 further comprising a plastic coating.

8. The compression spring sheet of claim 1 wherein said material comprises a plastic.

9. The compression spring sheet of claim 1 wherein upon the application of in-plane tensile force perpendicular to the longitudinal axes of said internal openings, said spring sheet exhibits approximately uniform stress along the edges of said openings, said stress at any point along said edge varying by no more than 15% relative to the mean stress along said edges.

10. The compression spring sheet of claim 1 wherein upon the application of in-plane tensile force perpendicular to the longitudinal axes of said internal openings, the average stress force on the material surrounding said internal openings is approximately equivalent to the average stress force on the material surrounding said peripheral openings.

11. A compliant compression mechanism for an electrochemical fuel cell assembly, said assembly comprising:

a first plate;

a second plate; and at least one membrane electrode assembly interposed between said first plate and said second plate, said mechanism comprising at least one spring sheet, each spring sheet comprising a generally planar material rendered resilient by having a plurality of openings formed therein, wherein each spring sheet extends between said first and second plates perpendicular to the plane of said at least one membrane electrode assembly, whereby each spring sheet urges said first plate towards said second plate such that compressive force is applied to said at least one membrane electrode assembly.

12. The compliant compression mechanism of claim 1 wherein said plurality of openings comprises internal openings of a first shape and dimension and peripheral openings of a second shape and dimension, wherein said internal openings are disposed in longitudinal rows extending between opposed ends of said spring sheet.

13. The compliant compression mechanism of claim 12 wherein at each of said opposed ends of said spring sheet, one of said peripheral openings is disposed at the end of each alternating row of internal openings.

14. The compliant compression mechanism of claim 13 wherein said first and second plates are endplates.

15. The compliant compression mechanism of claim 14 wherein a plurality of fuel cell assemblies are interposed between said first and second plates.

16. The compliant compression mechanism of claim 15 wherein a plurality of fuel cell stacks are interposed between said first and second plates.

17. The compliant compression mechanism of claim 11 wherein said at least one compression spring sheet comprises a pair of opposed spring sheets joined by at least one band extending perpendicularly to said spring sheets across the face of one of said plates.

18. The compliant compression mechanism of claim 11 wherein said at least one compression spring sheet comprises more than one adjacent compression spring sheet disposed between said first and second plates.

* * * * *